United States Patent
Toon

(10) Patent No.: US 10,563,588 B2
(45) Date of Patent: Feb. 18, 2020

(54) FUEL SYSTEM WITH VACUUM GENERATOR TO PURGE FUEL FROM FUEL NOZZLES

(71) Applicant: ROLLS-ROYCE PLC, London (GB)

(72) Inventor: Ian J Toon, Leicester (GB)

(73) Assignee: ROLLS-ROYCE plc, London (GB)

( * ) Notice: Subject to any disclaimer, the term of this patent is extended or adjusted under 35 U.S.C. 154(b) by 196 days.

(21) Appl. No.: 15/402,843

(22) Filed: Jan. 10, 2017

(65) Prior Publication Data
US 2017/0218846 A1  Aug. 3, 2017

(30) Foreign Application Priority Data

Feb. 2, 2016 (GB) .................................. 1601822.8

(51) Int. Cl.
*F02C 7/232* (2006.01)
*F02C 7/22* (2006.01)
(Continued)

(52) U.S. Cl.
CPC .............. *F02C 7/232* (2013.01); *F02C 7/222* (2013.01); *F04B 45/04* (2013.01); *F23R 3/343* (2013.01);
(Continued)

(58) Field of Classification Search
None
See application file for complete search history.

(56) References Cited

U.S. PATENT DOCUMENTS

| 3,901,025 A | 8/1975 | Bryerton et al. |
| 4,149,372 A | 4/1979 | Gavin et al. |

(Continued)

FOREIGN PATENT DOCUMENTS

| EP | 1944485 A2 | 7/2008 |
| EP | 2778371 A2 | 9/2014 |

(Continued)

OTHER PUBLICATIONS

Jun. 28, 2016 Search Report issued in British Patent Application No. 1601822.8.

(Continued)

*Primary Examiner* — Todd E Manahan
*Assistant Examiner* — Alyson Joan Harrington
(74) *Attorney, Agent, or Firm* — Oliff PLC

(57) ABSTRACT

A gas turbine engine fuel system including a combustor with at least one fuel injector, a fuel manifold that supplies fuel to each injector, a drain tank in fluid communication with the fuel manifold, and a vacuum generator that selectively provides below atmospheric pressure to the drain tank and includes first and second chambers separated by a flexible diaphragm. The fuel system also includes a first check valve that allows one-way flow from the fuel manifold into the fuel injector, and a second check valve that allows one-way flow from the fuel injector to the fuel manifold. The vacuum generator reduces a pressure within the second chamber causing the diaphragm to increase a volume of the first chamber and reduce a volume of the second chamber, such that expanding the first chamber causes below atmospheric pressure in the drain tank and fuel manifold, and the second check valve opens.

10 Claims, 5 Drawing Sheets

Figure 1:
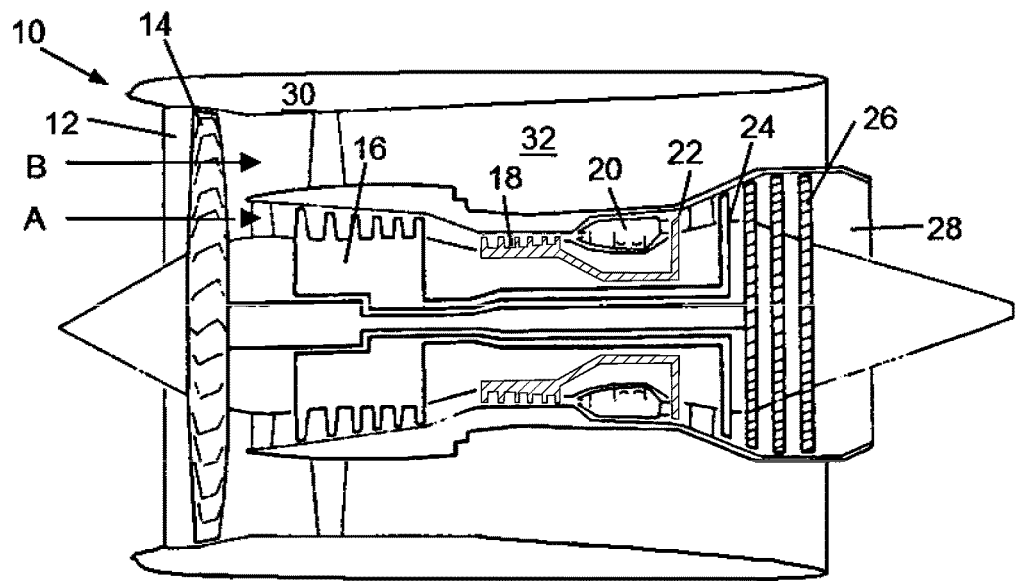

(51) Int. Cl.
*F04B 45/04* (2006.01)
*F23R 3/34* (2006.01)

(52) U.S. Cl.
CPC .... *F05D 2220/32* (2013.01); *F05D 2260/602* (2013.01)

(56) References Cited

U.S. PATENT DOCUMENTS

| | | | | |
|---|---|---|---|---|
| 5,235,814 A | * | 8/1993 | Leonard | F23R 3/283 60/738 |
| 2003/0110775 A1 | * | 6/2003 | Wernberg | F02C 7/232 60/773 |
| 2007/0245744 A1 | * | 10/2007 | Dooley | F01D 21/06 60/772 |
| 2016/0186671 A1 | * | 6/2016 | Austin | F02C 3/24 60/737 |

FOREIGN PATENT DOCUMENTS

| | | |
|---|---|---|
| EP | 2975240 A1 | 1/2016 |
| WO | 01/016472 A1 | 3/2001 |

OTHER PUBLICATIONS

Jun. 13, 2017 Search Report issued in European Patent Application No. 17150860.

* cited by examiner

FUEL SYSTEM WITH VACUUM GENERATOR TO PURGE FUEL FROM FUEL NOZZLES

The present disclosure concerns gas turbine engine fuel system.

Gas turbine engines comprise a fuel system for delivering fuel to a combustor. The fuel system typically comprises fuel passages terminating in a fuel injector located within the combustor.

During operation, fuel is pumped into the fuel injector such that fuel is supplied at the necessary pressure and flow rate for combustion to provide engine thrust. In some designs, on shutdown, fuel remaining in the injector can drain into a tertiary cavity of the injector resulting in loss of fuel, potential coking and environmental damage due to the resultant fuel vapour escaping into the atmosphere. "Tertiary cavities" are hollow regions of the fuel injector between the fuel conduit and the injector external structure. Such regions are frequently provided to allow for thermal expansion and contraction, and to shield parts of the fuel injector from the heat of combustion.

Such a problem occurs on many types of injector, but has been found by the inventors to be particularly pronounced where the fuel system comprises staged lean burn injectors comprising pilot and main Fuel Spray Nozzles (FSN). In such a system, fuel is supplied by the pilot injector at all operating conditions, and by the main fuel injector only at high power conditions. Consequently, as the engine is shutdown, the main fuel injector is shut-off while the engine is still running, while the pilot injector is shut-off when the engine is shut down. It has been found by the inventors that fuel is retained within areas of the pilot injector nozzle subsequent to shutdown by capillary action. After a duration of time after shutdown, the temperature of the pilot nozzle increases due to the lack of cooling flow and heat transferred from hot components. This causes the fuel retained within the pilot injector to vaporise, and subsequently drain into the tertiary cavity in either gaseous or liquid phase.

The present invention seeks to provide a gas turbine engine fuel system which seek to address the above problem.

According to a first aspect, there is provided a gas turbine engine fuel system comprising:
a combustor including at least one fuel injector;
a fuel manifold configured to supply fuel to each injector;
a drain tank in fluid communication with the fuel manifold;
a first check valve configured to allow one-way flow from the fuel manifold into the fuel injector, and a second check valve configured to allow one-way flow from the fuel injector to the fuel manifold;
wherein the system comprises a vacuum generator configured to selectively provide below atmospheric pressure to the drain tank.

By providing a vacuum generator configured to provide below atmospheric pressure to the fuel manifold, fuel is drawn from the fuel injector through the manifold to the drain tank on engine shutdown. Such operation is automatic provided a vacuum is provided, in view of the operation of the check valves. Consequently, fuel is prevented from building up within the fuel injectors on shutdown, or draining into the tertiary cavity.

The vacuum generator may comprise a hollow vessel having a movable piston, the hollow vessel and a first side of the movable piston defining a first variable volume internal space in fluid communication with the drain tank.

The movable piston may comprise a flexible diaphragm. The vacuum generator may comprise a resilient member configured to urge the movable piston to a position defining a relatively large first variable volume.

A second side of the movable piston and the hollow vessel may define a second variable volume selectively in fluid communication with a high pressure air source. The high pressure air source may comprise a bleed from a compressor of the gas turbine engine.

The second variable volume may selectively be in fluid communication with an ambient air source.

The system may comprise a high pressure air source regulator valve configured to regulate air pressure from the high pressure air source to the second variable volume internal space.

The system may comprise a vent valve configured to regulate air flow between the second variable volume and the ambient air source.

The manifold may comprise a drain valve configured to regulate fuel flow between the drain tank and the one or more injectors.

The fuel system may comprise a lean burn injector comprising a main fuel passage and a pilot fuel passage.

According to a second aspect of the invention, there is provided a gas turbine engine comprising a fuel system in accordance with the first aspect of the present invention.

The skilled person will appreciate that except where mutually exclusive, a feature described in relation to any one of the above aspects of the invention may be applied mutatis mutandis to any other aspect of the invention.

Figure 2:
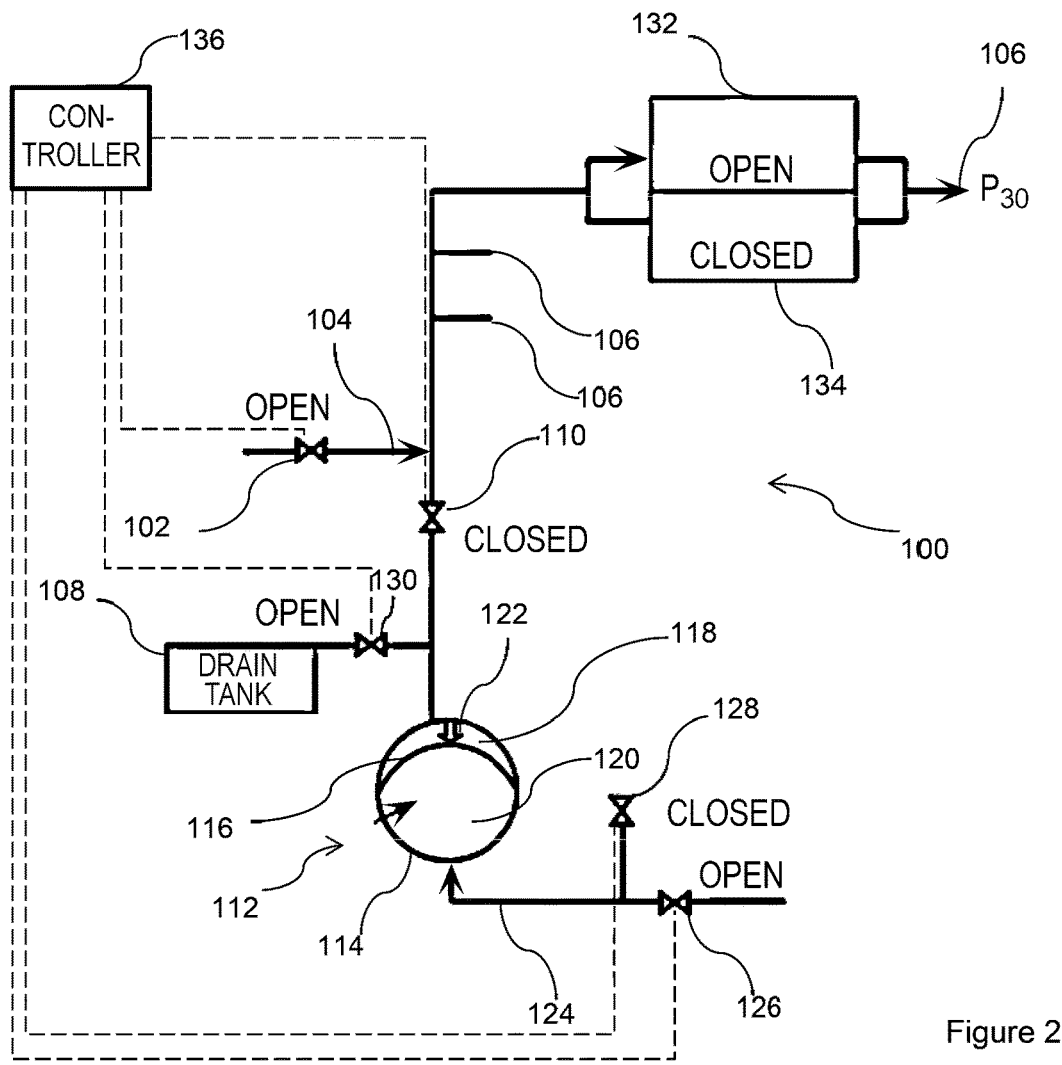
Figure 3:
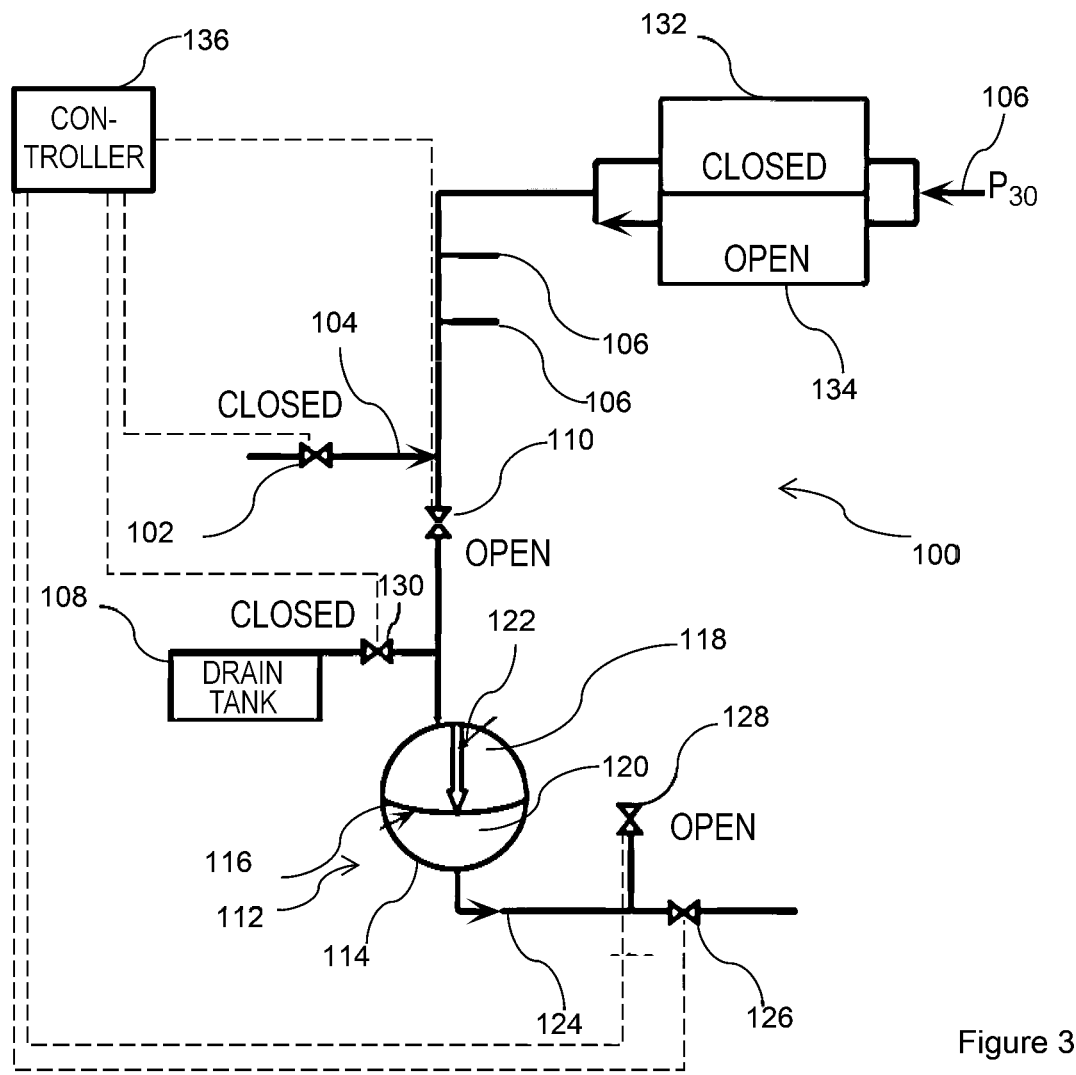
Figure 4:
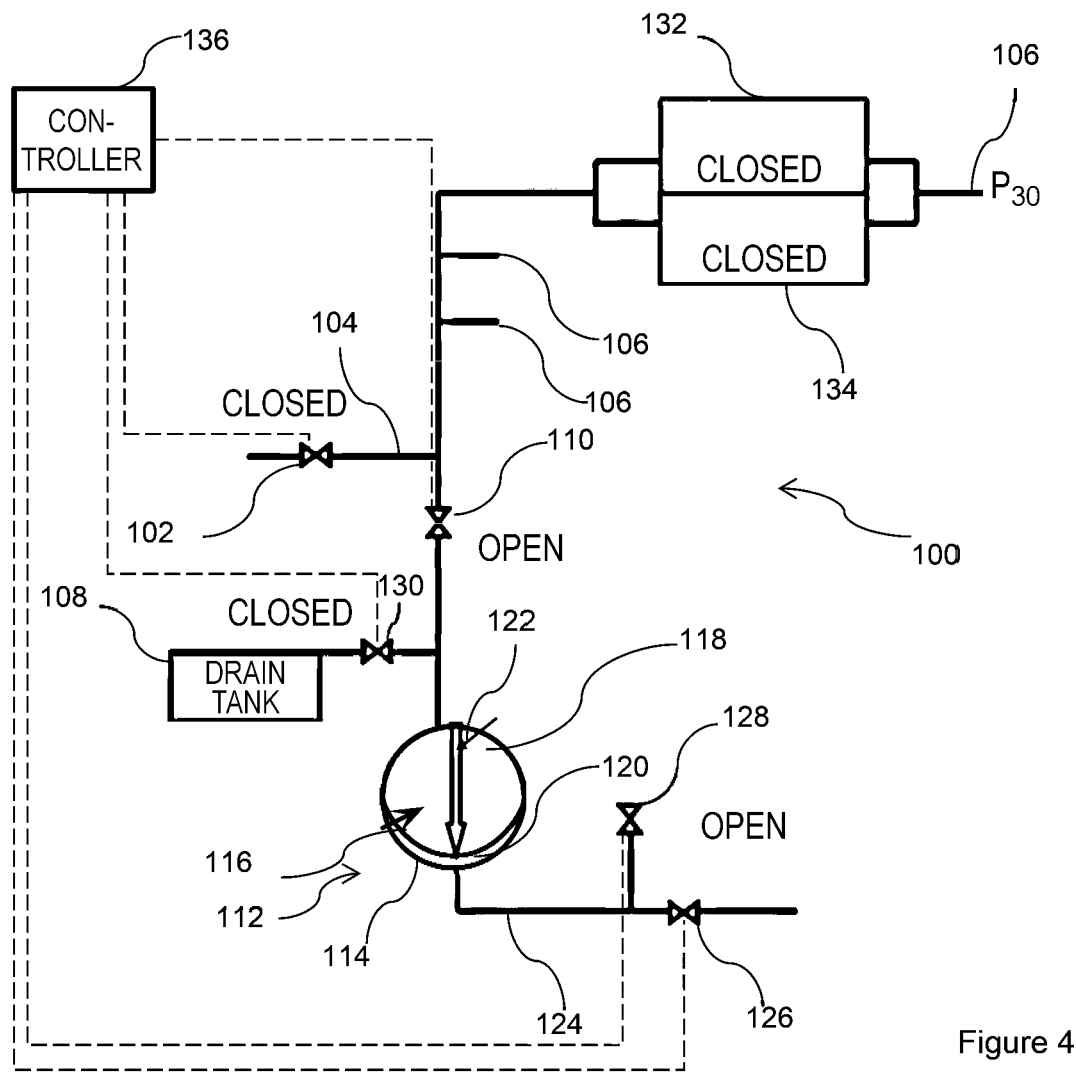
Figure 5:
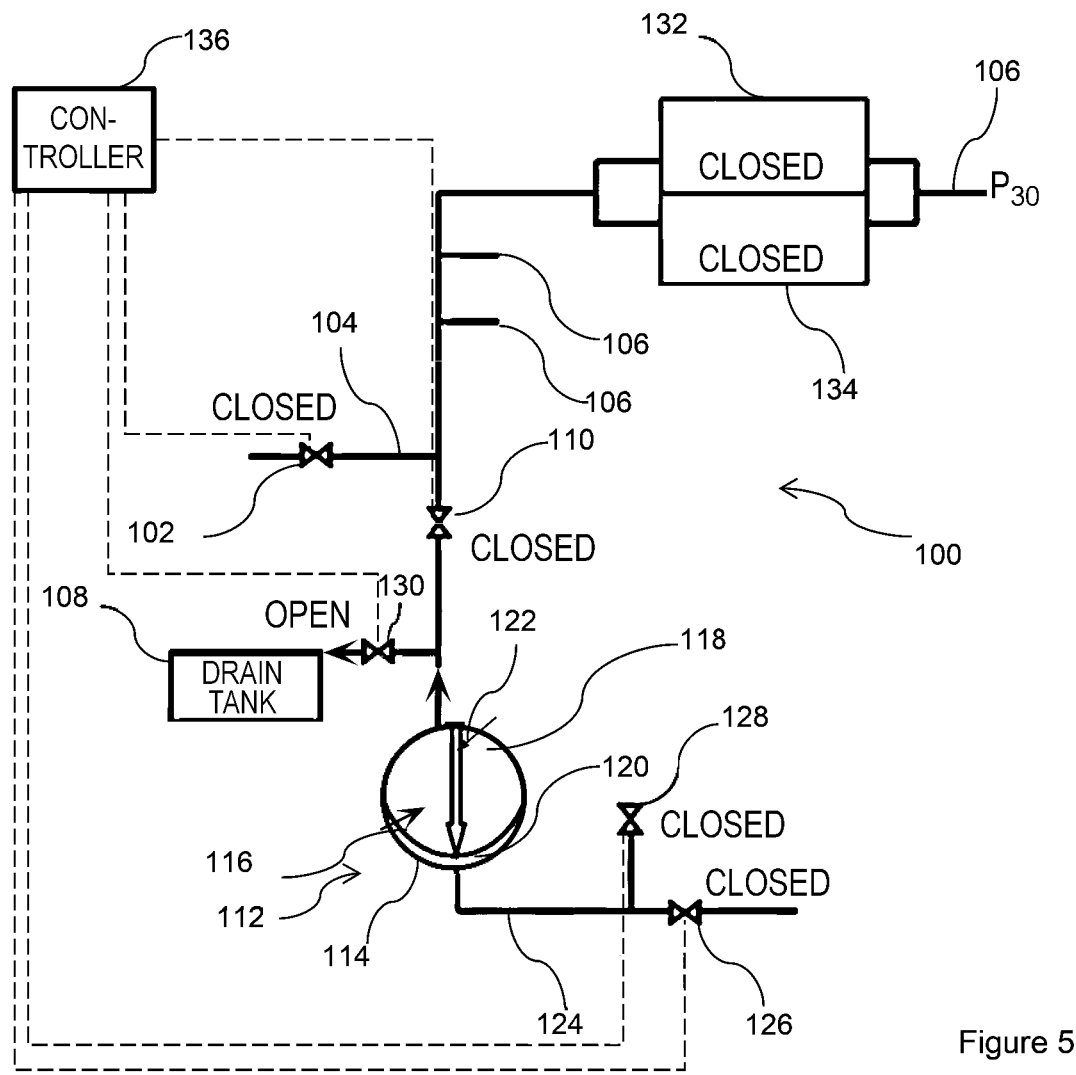
Figure 6:
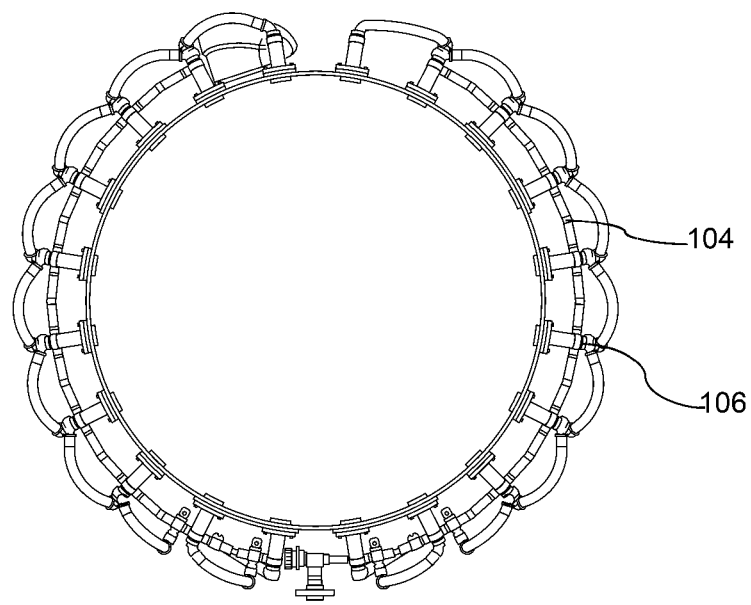
Figure 7:
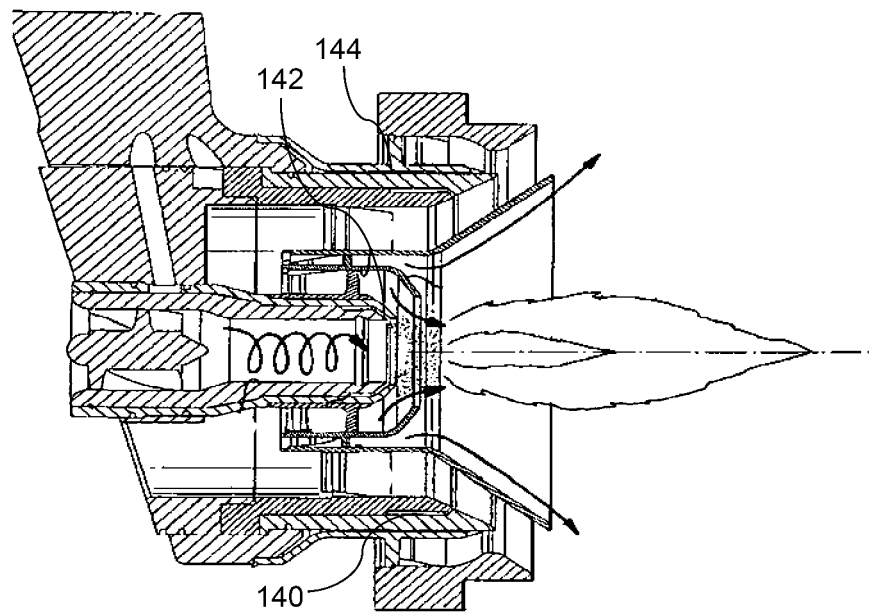

An Embodiment of the invention will now be described by way of example only, with reference to the Figures, in which:

FIG. 1 is a sectional side view of a gas turbine engine;
FIG. 2 is a schematic view of a fuel system for the gas turbine engine of FIG. 1 in a first configuration;
FIG. 3 is a schematic view of the fuel system of FIG. 2 in a second configuration;
FIG. 4 is a schematic view of the fuel system of FIG. 2 in a third configuration;
FIG. 5 is a schematic view of the fuel system of FIG. 2 in a fourth configuration;
FIG. 6 is an axial view of part of the fuel system of FIG. 2; and
FIG. 7 is a cross sectional view through a further part of the fuel system of FIG. 2.

With reference to FIG. 1, a gas turbine engine is generally indicated at 10. The engine 10 comprises, in axial flow series, an air intake 12, a propulsive fan 14, an intermediate pressure compressor 16, a high-pressure compressor 18, combustion equipment 20, a high-pressure turbine 22, and intermediate pressure turbine 24, a low-pressure turbine 26 and an exhaust nozzle 28. A nacelle 30 generally surrounds the engine 10 and defines both the intake 12 and the exhaust nozzle 28.

The gas turbine engine 10 works in the conventional manner so that air entering the intake 12 is accelerated by the fan 14 to produce two air flows: a first air flow into the intermediate pressure compressor 16 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

FIG. 2 shows a fuel system 100 of the gas turbine engine 10. The system 100 comprises a main fuel tank (not shown) and main fuel pump (not shown) which provide liquid hydrocarbon fuel to a flow control valve in the form of a Fuel Management Unit (FMU 102). The FMU 102 controls fuel flow rate through a passage in the form of a fuel manifold 104.

The fuel manifold 104 provides fluid communication between a plurality of fuel injectors 106 (one of which is shown in more detail in FIG. 7) and a drain arrangement comprising a drain tank 108 and a vacuum generator 112, via a drain arrangement valve 110.

The vacuum generator 112 comprises a rigid hollow vessel 114 (in the shape of a sphere in this example). Contained within the vessel 114 is a flexible diaphragm 116 which extends across the vessel 114 interior to define a first variable internal volume 118 on a first side, and a second variable internal volume 120 on a second side. The diaphragm 116 is urged toward the second side (as shown by the arrow) by a resilient member in the form of a spring 122. The first volume 118 is in fluid communication with the injectors 106 via the drain valve 106. The second volume 120 is in fluid communication with a pressurisation arrangement.

The pressurisation arrangement comprises an air passage 124. The second volume 120 is in fluid communication with a high pressure air source in the form of a compressor bleed of one of the main compressors 16, 18 of the gas turbine engine 10 via the air passage 124. High pressure air from the bleed can be selectively provided by operating a bleed air flow valve 126 provided in fluid flow between the second volume 120 and the compressor 16, 18. The air passage 124 further comprises an ambient air outlet controlled by an ambient pressure vent valve 128. Consequently, the pressure within the second volume 120 can be controlled by operation of the valves 126, 128, as described in further detail below.

The drain tank 108 comprises a fixed volume tank 108 configured to temporarily hold a volume of fuel from within the manifold 104. The drain tank 108 can be selectively fluidly coupled or decoupled from the manifold 104 via a separate drain tank valve 130. The drain tank 108 communicates with the fuel tank (not shown) via a pump (not shown) which is operated when the engine is in operation in order to drain fuel within the drain tank 108 back to the fuel tank.

The fuel manifold 104 further comprises first and second check valves (i.e. one-way valves) 132, 134, which are each provided upstream of each injector 106 (only two of which are shown for clarity).

The first one-way valve 132 is configured to permit fuel flow in the direction from the FMU 102 to the respective injector 106 where the relative pressure between the manifold and the fuel injector 106 at the location of the valve 132 exceeds a predetermined minimum, in this example, 20 Pounds per Square Inch (PSI), in the direction from the FMU 104 to the respective injector 106. Where the pressure is reversed, or is below the predetermined minimum, the first one-way valve 132 is configured to close.

The second one-way valve 134 operates similarly to the valve 132, but in the opposite direction, permitting fuel flow in the direction from the respective injector 106 to the FMU 102 where the relative pressure between the manifold and the fuel injector 106 at the location of the valve 134 exceeds a predetermined minimum, in this example, 5 PSI, this time in the direction from the respective injector 106 to FMU 104. Consequently, fuel flow toward and away from the injectors 106 is controlled by the valves 132, 134 by the relative fuel pressure within the manifold 104 compared to the pressure within the combustor 20.

An axial view of the manifold 104 is shown in FIG. 6. As can be seen, the manifold 104 extends around the circumference of the engine, with the injectors 106 being provided at spaced locations 106.

One of the injectors 106 is shown in FIG. 7. The injector 106 is of a lean burn type, comprising pilot and main fuel lines 142, 144. The invention may be equally applicable to main injectors, or single injectors in a rich burn fuel injection system. The system of the present disclosure may be in fluid communication with one or both of the pilot and main fuel lines 142, 144.

The injector 106 comprises a tertiary cavity 140 into which fuel would normally collect in the absence of the system in accordance with the present disclosure.

Each of the valves 102, 110, 130, 126, 128 is controlled by a controller 136 in accordance with the following method.

FIG. 2 illustrates operation of the system 100 where the engine is running. The FMU valve 102 is commanded to open by the engine controller 136. The degree of fuel flow through the manifold is determined by the FMU, though the pressure is always at least 20 PSI greater than the pressure within the combustor 20, which will be approximately the same as the high pressure compressor 18 exit pressure (P30). Since the pressure within the manifold 102 is greater than the pressure within the combustor 20, the second valve 134 is held closed. Consequently, fuel flows through the manifold 104 out of each injector 106. No commands from the controller 136 are necessary to enact operation of the valves 132, 134

Meanwhile, the drain valve 110 is commanded by the controller 136 to close to isolate the drain arrangement from the injectors 106 and FMU 102. The drain tank valve 130 is commanded open such that the drain tank 108 is in fluid communication with the first volume 118 of the vacuum generator 112, but not with the FMU 102 or injectors 106.

The ambient pressure valve 128 is commanded to close, and the bleed valve 126 is commanded to open, such that the air passage 124 is pressurised with P20 or P30 air from one of the compressors 16, 18.

In view of the low pressure provided on the first side of the diaphragm 116, and the high pressure on the second side of the diaphragm in view of the operation of valves 110, 130, 126, 128, against the pressure of the spring 122, the diaphragm is urged toward the first side, thereby resulting in a relatively small first volume 118 within the vacuum arrangement 112. Consequently, fuel will be provided to the combustors 106, while the vacuum arrangement 112 is maintained in a "primed" position.

FIG. 3 shows the system 100 immediately after engine shutdown. When the engine 10 is shutdown, the controller 136 commands valves 102, 130, to close, and valves 110, 128 to open. Consequently, pressure of the fuel within the manifold 104 drops rapidly, while pressure within the combustor 20 is maintained for a period of time (due to continued rotation of the compressors 16, 18 due to their inertia).

Consequently, the pressure differential at the location of the check valves 132, 134 reverses, such that the pressure downstream of the valves 132, 134 is now higher than the pressure upstream. Consequently, check valve 132 closes, and check valve 134 opens.

In view of the opening of the ambient pressure valve 128, the pressure on the second side of the diaphragm is reduced. This reduces or reverses the pressure differential on the diaphragm, which, in combination with the urging provided by the spring 122, urges the diaphragm to toward the second end, thereby increasing the first volume 118 and reducing the second volume 120, thereby creating a partial vacuum (i.e. a region of less than ambient pressure) within the manifold 104. This partial vacuum assists in opening the second check valve 134.

In view of the now open drain arrangement valve 110, the open second check valve 134, the closed FMU valve 102 and the partial vacuum within the manifold 104, fuel flows from the injectors 106 into the drain arrangement. Since the drain valve 130 is closed, fuel enters the first volume 118 of the vacuum generator 112.

Fuel continues to flow into the first volume 118 until all the fuel within the injectors 106 and manifold 104 has been drained into the first volume 118.

FIG. 4 shows the engine a period of time (say, 20 seconds) after engine shutdown. At this point, the compressors 16, 18 have essentially stopped, and pressure within the combustor 20 has returned to ambient. All the fuel has been drained into the first volume 118, and air is now drawn through the injectors 106 into the first volume 118 until the first volume 118 expands to it full extent, as defined by the maximum extent of the spring 122, and spaced defined by the second volume 120. At this point, the vacuum generator 112 ceases operate, and both the manifold 104 and the combustor 20 are at ambient pressure. Consequently, the pressure differential necessary to maintain the second check valve 134 is no longer provided, and so the second check valve shuts, as shown in FIG. 4. Fuel is now retained within the first volume 118 of the vacuum generator 112, which could be provided at a lower position within the engine 10 than the remainder of the manifold, or any of the injectors 106.

The operation of the above system does not require any external power, relying only on the natural evolution of pressure gradients within the engine 10 following shutdown and the pressure provided by a resilient member in combination with the operation of a check valve. This is particularly advantageous in the context of aviation gas turbine engines, wherein power (such as electrical, hydraulic and pneumatic) is not generally available subsequent to engine shutdown. Consequently, the system provides a reliable method for preventing the loss of fuel through the injectors subsequent to engine shutdown while requiring minimal system changes.

FIG. 5 shows the arrangement at a later stage, where the engine is to be started again. The engine is restarted in a sequence comprising first and second stages In the first stage of the restart, with fuel from the previous shutdown sequence still remaining in the first volume 118 of the vacuum generator 112, the controller 136 commands each of valves 102, 110, 126, 128 to close (or remain closed), and drain tank valve 130 to open.

During the second stage of the restart, the system 100 returns to the state shown in FIG. 2. The controller 136 commands the FMU valve 102 to open, to thereby commence fuel flow to the injectors 106 to start combustion. The increased pressure within the manifold 104 causes the first check valve 132 to open, and the second check valve 134 to close, thereby including fuel to enter the combustion chamber through the injectors 106.

Meanwhile, as the drain tank valve 130 remains open, and the vent valve remains closed, below ambient pressure within the drain tank due to operation of the fuel tank return pump causes below ambient pressure to exist on the first side of the diaphragm 116. Meanwhile, the compressors 16, 18 are accelerated by the engine start-up sequence. This results in bleed air entering the air passage 124 via bleed valve 126 and raising the pressure on the second side of the diaphragm 116. Consequently, the diaphragm 116 is urged toward the first side, thereby increasing the second volume 120, and reducing the first volume 118. Fuel contained within the first volume 118 is thereby ejected from the first volume 118, and transferred to the drain tank 108 via the drain tank valve 130. The fuel tank return pump then empties the drain tank 108 as the engine 10 continues to operate.

It will be understood that the invention is not limited to the embodiments above-described and various modifications and improvements can be made without departing from the concepts described herein. For example, other types of vacuum generators could be employed, such as an electrically powered vacuum pump. The first and second check valves could be replaced with a single check valve performing the same function.

Except where mutually exclusive, any of the features may be employed separately or in combination with any other features and the disclosure extends to and includes all combinations and sub-combinations of one or more features described herein.

The invention claimed is:

1. A gas turbine engine fuel system comprising:
a combustor including at least one fuel injector;
a fuel manifold configured to supply fuel to each injector;
a drain tank in fluid communication with the fuel manifold;
a vacuum generator configured to selectively provide below atmospheric pressure to the drain tank, the vacuum generator including a first chamber and a second chamber separated by a flexible diaphragm, the first chamber being in fluid communication with the fuel manifold, and the second chamber is in fluid communication with a high pressure air source through an air passage;
a first check valve configured to allow one-way flow from the fuel manifold into the at least one fuel injector, and a second check valve configured to allow one-way flow from the at least one fuel injector to the fuel manifold; and
at least one upstream valve and at least one downstream valve, the at least one upstream valve being located between the vacuum generator and the first and second check valves, and the at least one downstream valve being located between the vacuum generator and the high pressure air source, wherein:
the vacuum generator reduces a fluid pressure within the second chamber to provide the below atmospheric pressure in the fuel manifold by changing an open/closed state of the at least one upstream valve and opening the at least one downstream valve causing the flexible diaphragm to increase a volume of the first chamber and correspondingly reduce a volume of the second chamber, and
the second check valve opens in response to the below atmospheric pressure in the fuel manifold.

2. The system according to claim 1, wherein the vacuum generator includes a hollow vessel having a moveable piston, the hollow vessel and a first side of the moveable piston defining a first variable volume in fluid communication with the drain tank.

3. The system according to claim 2, wherein the moveable piston includes the flexible diaphragm.

4. The system according to claim 2, wherein the vacuum generator includes a resilient member configured to urge the moveable piston to a position changing the first variable volume.

5. The system according to claim 2, wherein a second side of the moveable piston and the hollow vessel define a second variable volume selectively in fluid communication with the high pressure air source.

6. The system according to claim 5, wherein the second variable volume is selectively in fluid communication with an ambient air source.

7. The system according to claim 6, further comprising the downstream valve configured to regulate air flow between the second variable volume and the ambient air source.

8. The system according to claim 1, wherein the fuel manifold includes a drain valve configured to regulate fuel flow between the drain tank and the at least one fuel injector.

9. The system according to claim 1, wherein the at least one fuel injector is a lean burn injector including a main fuel passage and a pilot fuel passage.

10. A gas turbine engine comprising the fuel system according to claim 1.

* * * * *